United States Patent [19]

Hiramatsu

[11] Patent Number: 5,346,257
[45] Date of Patent: Sep. 13, 1994

[54] PRETENSIONER FOR VEHICLE SEAT BELTS

[75] Inventor: Koji Hiramatsu, Shiga, Japan
[73] Assignee: Takata Corporation, Tokyo, Japan
[21] Appl. No.: 7,153
[22] Filed: Jan. 21, 1993
[30] Foreign Application Priority Data Jan. 21, 1992 [JP] Japan .................. 4-029093

[51] Int. Cl.⁵ .............................. B60R 22/46
[52] U.S. Cl. .................. 280/806; 297/480
[58] Field of Search ............... 280/806; 297/478, 480

[56] References Cited

U.S. PATENT DOCUMENTS

| | | | |
|---|---|---|---|
| 3,620,569 | 11/1971 | Mathis | 297/478 |
| 3,917,031 | 11/1975 | Doin et al. | 297/480 |
| 4,253,623 | 3/1981 | Steger et al. | 280/806 |
| 4,705,296 | 11/1987 | Andersson et al. | 280/806 |
| 4,999,004 | 3/1991 | Skanberg et al. | 297/480 |

FOREIGN PATENT DOCUMENTS

| | | |
|---|---|---|
| 63-35017 | 9/1988 | Japan . |
| 1-119455 | 5/1989 | Japan . |
| 1-164651 | 6/1989 | Japan . |
| 3295740 | 12/1991 | Japan .................. 280/806 |

*Primary Examiner*—Margaret A. Focarino
*Assistant Examiner*—Paul N. Dickson
*Attorney, Agent, or Firm*—Brumbaugh, Graves, Donohue & Raymond

[57] ABSTRACT

A pretensioner for a vehicle seat belt system comprises a pair of driving members arranged in tandem and spaced apart laterally from each other on either side of a space between them and a connector driven by the driving members and arranged such that at least a portion moves through the space between the driving members when the pretensioner is operated.

2 Claims, 5 Drawing Sheets

PRETENSIONER FOR VEHICLE SEAT BELTS

BACKGROUND OF THE INVENTION

The present invention relates to a pretensioner for vehicle seat belts, and in particular to a pretensioner suitable for pretensioning a belt by pulling on a buckle to which the belt is connected.

In some seat belt systems used in vehicles such as automobiles, a pretensioner is provided for preventing movement of the body of an occupant through tightening of the belt when excessive acceleration is applied on the vehicle and thereby providing greater restraint of the occupant. A pretensioner can be installed at various locations in a seat belt system. In particular, it is useful for improving occupant restraint when a buckle tongue positioned at the juncture between a shoulder section and a lap section of a belt webbing is pulled on, because tension is imparted uniformly to both belt sections. Thus, a buckle pretensioner has been proposed to pull the buckle, into which the tongue is inserted when the belt is put on.

For example, buckle pretensioners are disclosed in Japanese Patent Laid-Open Publications No. 61-241234, No. 1-119455, No. 1-164651, and No. 2-256550. A pretensioner is also disclosed by the Japanese Utility Model Laid-Open Publication No. 63-35017, although it is not designed to pull on the buckle. Those prior art pretensioners use torsion bars, compression coil springs, spiral springs, air cylinders and the like as driving devices and pull the buckle (or another element of the belt system) through a connection member by a driving force.

The driving devices of belt pretensioners provide powerful driving forces that act within very short times. Thus, to secure a certain stroke necessary for imparting pretension, belt pretensioners are of large size. It is not possible to install them on the buckle in the vehicle, and they are unattractive in appearance. Accordingly, pretensioners having torsion bars are installed horizontally below the seat, and those having compression coil springs are usually installed horizontally on the side of the seat or at some other position.

However, when the pulling direction of the buckle, which is to be pulled in a longitudinal direction, is different from the operating direction of the driving device, as in many known arrangements (except the last mentioned example), there must be provided a complicated direction-changing mechanism between the driving device and the drive element. Such direction-changing mechanism will not only lead to a complicated and large pretensioner, but may decrease the driving force for pulling, which is to be transmitted from the driving device to the buckle.

In the pretensioner of Publ. No. 63-35017, referred to above, the compression coil spring serving as the driving means is arranged coaxially with the belt-pulling direction, and the compression coil spring is installed horizontally as seen from the mounting condition of the inertia body (locking device). The mechanism with such an arrangement cannot be applied directly for the pulling of the buckle, which is to be pulled in a longitudinal direction. Even if such is possible, there must be provided locking means for preventing the belt from slackening after operation of the pretensioner, and the arrangement of such means leads to an increase in the axial or radial dimensions of the entire system.

SUMMARY OF THE INVENTION

To solve the above problems, it is an object of the present invention to provide a pretensioner, having a simplified arrangement that uses an axially-arranged driving device which can drive in the same direction as the pulling direction of the belt and requires no direction change, to minimize the radial dimension by dividing the axially driving components, to make the entire system compact by placing the connecting device in the space between the divided driving components and to reduce loss of force caused by a direction change in the force.

The foregoing object is attained, according to the present invention, by an improvement in a pretensioner for a vehicle seat belt system of the type having a connector connected to a belt system component and axial driving elements for moving the connector along a predetermined path. The improvement involves providing a pair of driving members arranged in tandem and spaced apart laterally from each other on either side of a space between them and arranging the connector such that at least a portion moves through the space between the driving members when the pretensioner is operated.

With the present invention, if an acceleration higher than a predetermined value is applied to the vehicle, it is detected, the axial driving devices are operated, and the connector is moved by the driving devices into the space between them. By this operation, the seat belt to which the connector is coupled is pretensioned.

DESCRIPTION OF THE EMBODIMENTS

Figure 1:
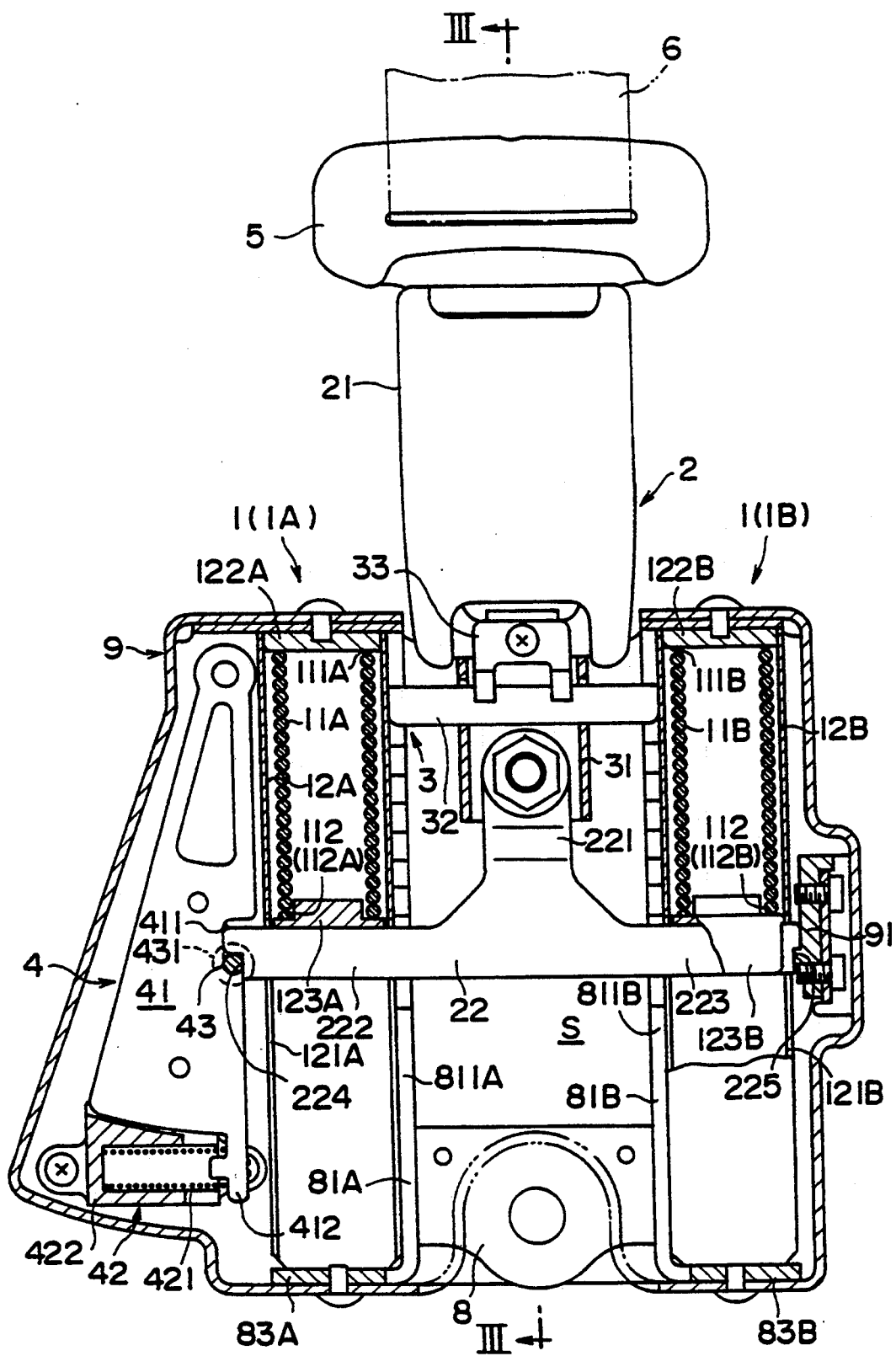
FIG. 1 is a side elevational view of a first embodiment, with portions broken away in cross-section, in which the present invention is applied to a buckle pretensioner.
Figure 2:
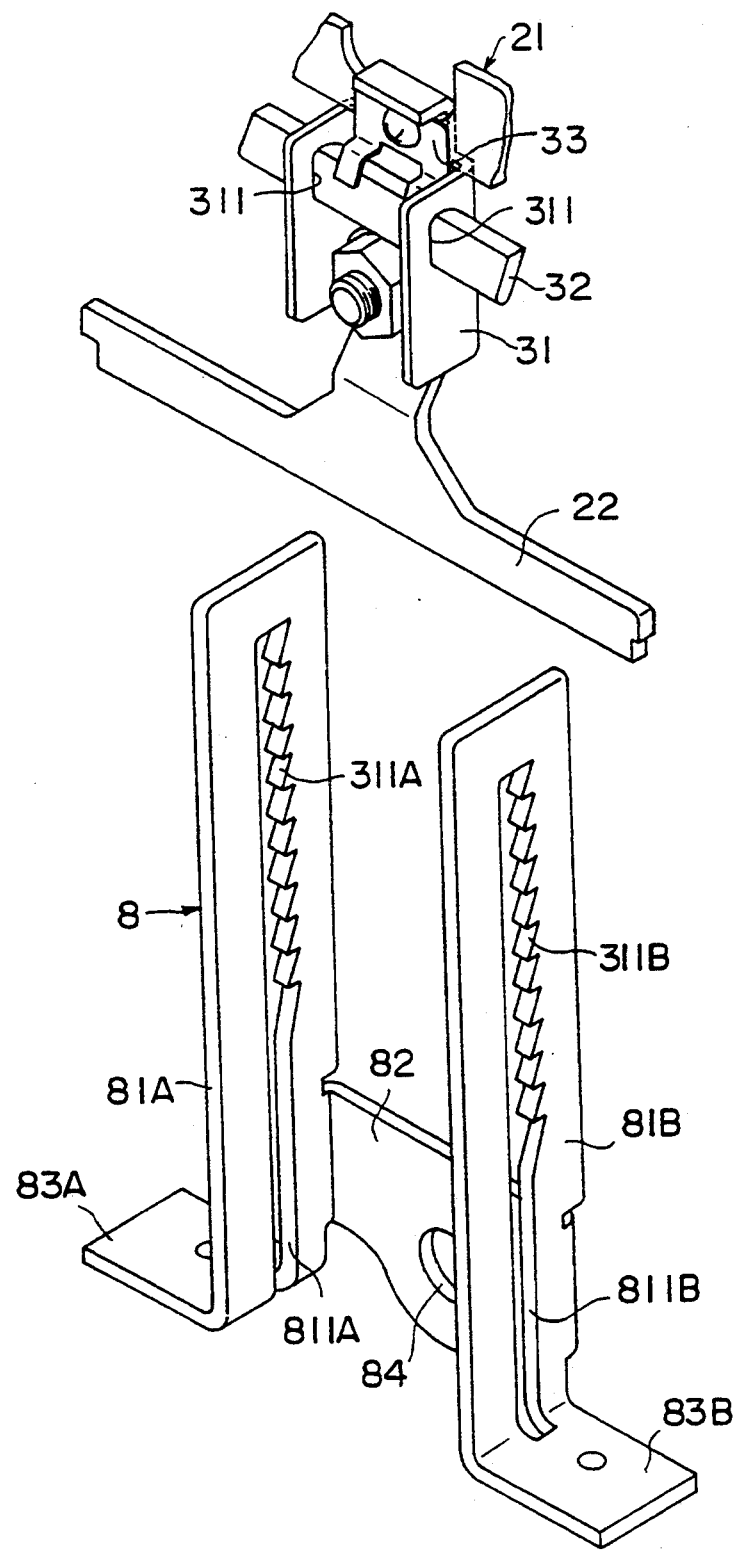
FIG. 2 is an exploded perspective view of some of the components of the first embodiment of the invention.
Figure 3:
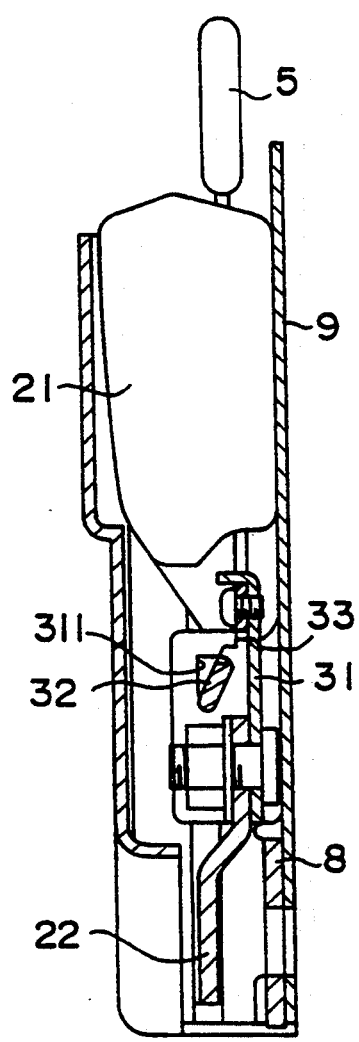
FIG. 3 is a cross-sectional view along the line III—III of FIG. 1, showing the positions of each component after the buckle pretensioner of the first embodiment has been operated.

In the embodiment of FIGS. 1 to 3, the pretensioner, which is a buckle pretensioner, comprises axially-acting driving means 1, connecting means 2, return-stop means 3, starting means 4, a bracket 8 for attaching the driving means 1 and the return-stop means 3 to the vehicle, and a cover 9. It is designed such that a belt 6 connected to the operating ends 112 of the driving means 1 by the connecting means 2 is pulled in by the driving means. The driving means 1 comprises a pair of axially-acting driving devices 1A and 1B arranged in tandem with each other with a space between them. The connecting means 2 is connected to the operating ends 112A and 112B of the axially-acting driving devices 1A and 1B, respectively, and moves into the space between the driving devices 1A and 1B when the pretensioner is operated.

As best seen in FIG. 2, the pretensioner is mounted on the buckle bracket 8, and the buckle bracket 8 is provided with a pair of front and rear longitudinal walls 81A and 81B facing each other with a space S (a space for pulling the buckle 21 in the present example) between them, a cross piece 82 for connecting the longitudinal walls in its lower portion, and bottom feet 83A and 83B extending outwardly forward and backward from the lower ends of the longitudinal walls 81A and 81B, respectively. On the two longitudinal walls 81A and 81B, slits 811A and 811B are formed, respectively, almost over the entire length, and a bolt hole 84 for affixing the bracket to the car body is provided on the side wall 82. (For convenience, the right side of FIG. 1 is referred to as the front and the left side as the rear.)

Referring back to FIG. 1, the axially-acting driving means 1A and 1B comprise, in the embodiment, compression coil springs 11A and 11B, and cylindrical spring guide tubes 12A and 12B for accommodating the springs and having a pair of axial slits 121A and 121B at their lower portions. The upper base ends 111A and 111B of the springs 11A and 11B are abutted and supported by spring seats 122A and 122B at the upper ends of the spring guide tubes 12A and 12B. The lower operating ends 112A and 112B are abutted and supported by a spring stopper 22, which constitutes a part of the connecting means 2, through spring seats 123A and 123B. The spring guide tube 12A is located in front of the longitudinal wall 81A of the bracket 8, the spring guide tube 12B is arranged in the rear of the longitudinal wall 81B, the upper ends of the guide tubes are supported by the upper wall of the base 9, and their lower ends are supported by the bottom walls 83A and 83B of the buckle bracket 8.

The connecting means primarily comprises a buckle 21 in the embodiment. As auxiliary means for connecting the buckle 21 to the belt 6 and the axially driving means 1A and 1B, a tongue 5 slidably mounted on the belt 6 and a part of return-stop means 3 as described below are used in addition to the spring stopper 22. The buckle 21 and the tongue 5 are of a commonly known design, and a detailed description is not given here.

The spring stopper 22 comprises an upper connection arm 221 extending upwardly from the central portion of the spring stopper and is rotatably connected to the buckle 21. It is a plate of inverted T-shape, which has a front arm 222 and a rear arm 223 extending horizontally in forward and backward directions, respectively. On these two arms 222 and 223, the operating ends of the main springs 11A and 11B are abutted and supported through the spring seats 123A and 123B. On the outer lower ends of the two arms 222 and 223, notches 224 and 225 are formed, respectively. The upper end of the upper connection 221 of the spring stopper 22 is rotatably fixed by a bolt on a pawl holder 31 of the return-stop means 3, and the front arm 222 and the rear arm 223 protrude in the front and the rear of the spring guide tubes 12A and 12B through slits 811A and 811B in the buckle bracket 8 and axial slits 121A and 121B of the spring guide tubes.

As shown in FIG. 2, the return-stop means 3 comprises ratchet teeth 311A and 311B formed on the edges of the slits 811A and 811B of the longitudinal walls 81A and 81B of the buckle bracket 8 inside (rearwardly of) the spring guide pipes 12A and 12B, an elongated plate-like pawl 32 horizontally positioned and movably supported on a pawl holder 31, and a fork-like pawl spring 33 arranged at the center of the pawl 32 to resiliently urge both ends of the pawl 32 toward the teeth 311A and 311B and fastened to the pawl holder 31. The pawl holder 31 is in the form of a channel and has a bent upper wall that is engaged with a fitting on the buckle 21 and fastened to it. Fan-shaped pawl-supporting holes 311 are formed on side walls. The pawl 32 is inserted through the pawl-supporting holes 311, and with its lower edge supported by the lower edges of said holes, it is positioned in such a manner that it can be rocked toward and away from the ratchet teeth 311A and 311B. The pawl spring 33 has its forked ends engaged against the front of the pawl 32 and pushes the pawl 32 rearwardly. The upper edges of both ends of the pawl 32 are engaged with the lower shoulders of the teeth of the buckle brackets 31A and 31B.

As shown in FIG. 1, the starting means 4 comprises a fan-shaped weight 41, the upper end of which is supported on the base 9 by a pin so that it can pivot back and forth, and biasing means 42 (e.g., a spring) for holding and pushing the weight to the "set" position. The starting means is arranged in front of the spring guide tube 12A within the base 9. The weight 41 is provided with a recess 411 formed at the center of its rear edge and with a projection 412 extending downward. A roller 43 is supported by the recess 411, and the end of the spring stopper 22 is squeezed by collars 431 on both sides of the roller 43. The weight 41 and the spring stopper 22 are engaged with each other through the roller 43. The projection 412 is abutted by the operating end of a set spring 421 of the pushing means 42, and the base end of the set spring 421 is inserted into a spring seat block 422 and is supported by it. Facing toward said recess 411 is a sub-pawl 91 that is fastened by a screw to the base 9 to the rear of the spring guide tube 12B. This constitutes a stopper for supporting the end of the spring stopper 22 opposite from the starting means in the set position.

FIG. 1 shows the pretensioner in the set condition. The notch 224 on the stopper is supported by the weight 41 through the roller 43, and the notch 225 is supported by the sub-pawl 91. The springs 11A and 11B are held in the set condition with maximum compression. In this condition, the buckle 21 is at the uppermost position, and the inserted tongue 5 causes the belt 6, which passes through it, to run loosely along the body of the occupant.

The operation of the pretensioner is as follows. When an acceleration higher than a predetermined value is applied on the vehicle and is detected by the weight 41, which serves as a sensor, the weight compresses the set spring 421 by inertial force and rotates clockwise in the figure. By this rotation of the weight 41, the roller 43 starts rolling and is separated from the notch 224 of the spring stopper. Having lost the support on the main spring 11A, the spring stopper 22 is slightly tilted around the supporting point on the sub-pawl 91 by the resilient force of the spring 11A. It is then separated from the supporting point and is pulled quickly downward by the force of the two springs 11A and 11B.

By this operation, the buckle 21 connected to the spring stopper 22 is pulled into the space S within the cover 9 accompanied by the tongue 5 and together with the pawl holder 31. The pawl 32 moves down to the lowermost position, while it is repeatedly pushed forward by the teeth 311A and 311B of the buckle bracket 8. When it reaches the lowermost position shown in FIG. 3, the spring stopper 22 hits the bottom walls 83A and 83B of the bracket 8 and stops. The pawl 32 becomes engaged with the lowermost ratchet teeth, and return movement of the spring stopper 22 is restricted by the checking action of the teeth. Thus, loosening of the belt 6 after the pulling operation is prevented, and the pretension imparted to the belt is maintained.

As described above, in the pretensioner of the above embodiment, the buckle 21 upon being pulled, is received in the buckle bracket 8 supported on the car body, and the axially driving means 1A and 1B as well as the return-stop means 3 are arranged side by side within the length of the bracket 8. As the result, the dimension of the pretensioner is minimized vertically. Because the axially-acting driving means 1A and 1B are divided into two parts and the outer diameter is reduced, its lateral dimension is minimized to be approximately equal to the thickness of the buckle 21. Further, the starting device 4 is a mechanical device, using the weight 41, and is integrated with the pretensioner. Thus, there is no need to provide an electrical sensor, and this eliminates time and labor for special wiring.

Figure 4:
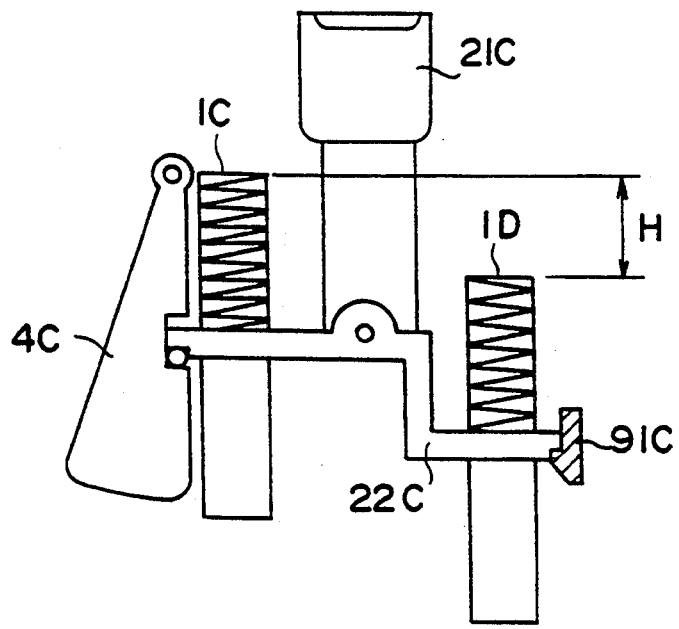
FIG. 4 is a side view schematically illustrating a second embodiment of the invention.

The second embodiment, shown in FIG. 4, is substantially the same as the first embodiment of the invention. (The corresponding components are designated by the same reference symbols, which also applies to the other embodiments described below.) The only exception is that the positions of the axially-acting driving means 1C and 1D are deviated by a distance H in the axial (vertical) direction between the front and the rear ones. This arrangement can be modified according to the relationship of the pretensioner with the layout of the vehicle on which the pretensioner is to be mounted, mainly a desire or need to tilt the pretensioner upwardly and forwardly. Some examples are given below.

Figure 5:
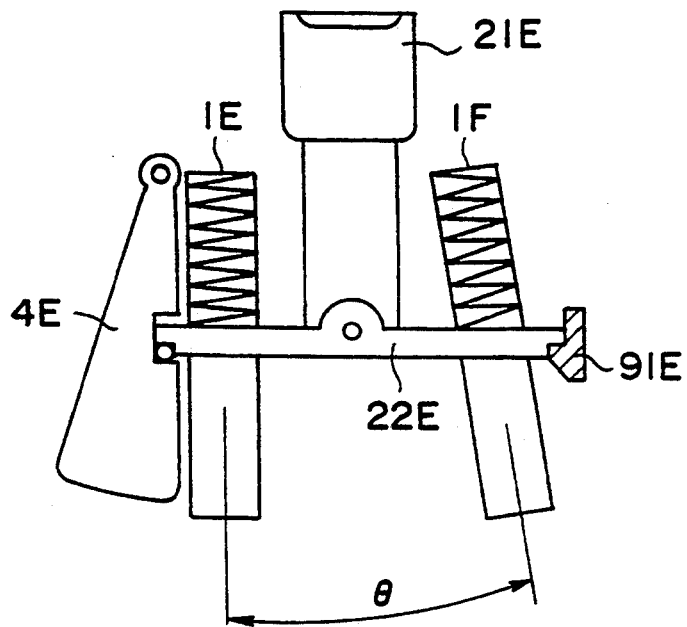
FIG. 5 is a side view schematically illustrating a third embodiment of the invention.
Figure 6:
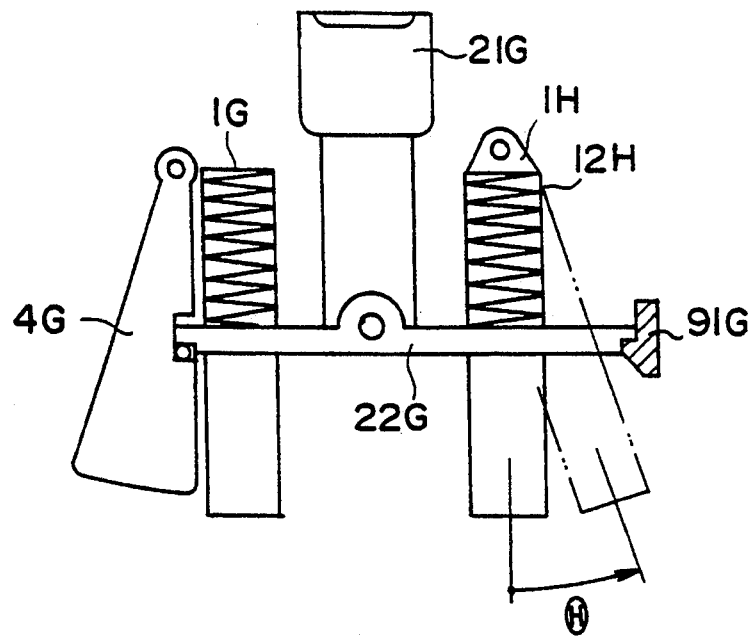
FIG. 6 is a side view schematically illustrating a fourth embodiment of the invention.
Figure 7:
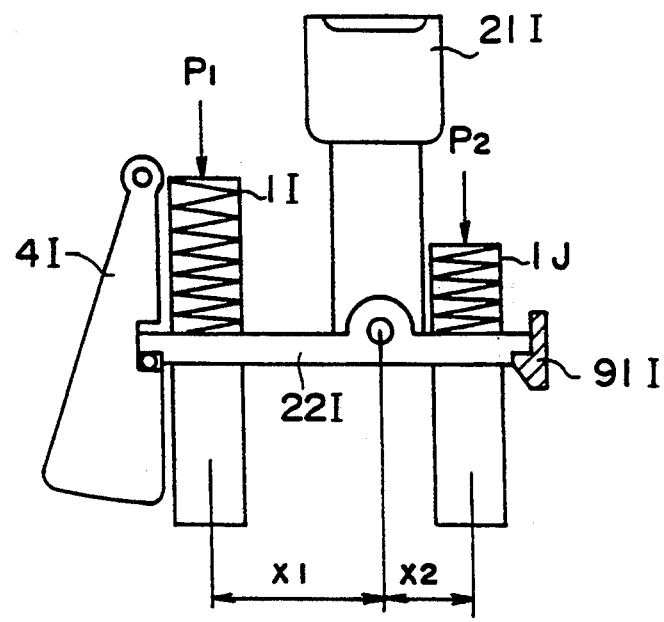
FIG. 7 is a side view schematically illustrating a fifth embodiment of the invention.

FIG. 5 shows a third embodiment of the present invention, in which one axially-acting driving means 1F is tilted by an angle ($\Theta$). FIG. 6 shows a fourth embodiment of the invention, in which one axially-acting driving means 1H is supported on the base in such a manner that the angle ($\Theta$) can be adjusted freely. Further, FIG. 7 represents a fifth embodiment of the invention, in which positions of the two axially-acting driving means 1I and 1J with respect to the buckle 21I are of different axial lengths, and the spring constants of the driving means 1I and 1J are varied accordingly. That is "distance (x1)×spring load (P1)" is made equal to "distance (x2)×spring load (P2)" so that the moment of the spring stopper 22I around the supporting point with respect to the buckle 21I is equal for both springs.

The embodiments are intended to be exemplary, and whereas they provide for pulling in the buckle, the present invention is not limited to the above embodiment and can be applied to any part of a seat belt system. The specific arrangements of the components can, therefore, be modified within the scope of the claim attached hereto. For example, the axially-acting drive means can be of the gas pressure-operating type. In such case, the starting means is an ignition signal from an electrical sensor. Also, an electromagnetic device to operate the starting means by an electrical sensor can be used where the axially-acting driving means are springs.

As described above the belt-pulling direction is made the same as the driving direction of the driving means in the pretensioner of the present invention. Thus, direction change is not required, and the force of the driving means can be effectively transmitted to the belt through a simplified arrangement. This contributes to high reliability of the operation and to elimination of operational losses due to a direction change. Further, it is possible to design the entire system in compact form because the axial dimensions are minimized by dividing the axially-acting driving means and the connecting means is pulled into the space between the tandem driving means.

I claim:

1. In a pretensioner for a vehicle seat belt system having connector means connected to a belt system component and axial driving means for moving the connector means along a predetermined path, the improvement wherein the driving means exerts axial driving forces on the connector means in substantially the same direction as the path of movement of the connector means and includes a pair of driving members arranged in tandem and spaced apart laterally from each other on either side of a space between them, and the connector means includes at least a portion that upon movement along the path moves through the space between the driving members.

2. A pretensioner according to claim 1 wherein the connector means is a buckle of the vehicle seat belt system.

* * * * *